United States Patent
Vegh

(10) Patent No.: US 9,201,163 B2
(45) Date of Patent: Dec. 1, 2015

(54) DUAL LASER ARTICLE DETECTION SYSTEM

(71) Applicant: Intelligrated Headquarters, LLC, Mason, OH (US)

(72) Inventor: Mark Kenneth Vegh, Frederick, MD (US)

(*) Notice: Subject to any disclaimer, the term of this patent is extended or adjusted under 35 U.S.C. 154(b) by 0 days.

(21) Appl. No.: 14/296,521

(22) Filed: Jun. 5, 2014

(65) Prior Publication Data

US 2014/0360843 A1 Dec. 11, 2014

Related U.S. Application Data

(60) Provisional application No. 61/832,339, filed on Jun. 7, 2013.

(51) Int. Cl.
*B65G 43/00* (2006.01)
*G01V 8/20* (2006.01)

(52) U.S. Cl.
CPC . *G01V 8/20* (2013.01); *B65G 43/00* (2013.01)

(58) Field of Classification Search
CPC .......... G01B 11/24; G01B 11/25; G01V 8/20; B65G 43/00; B65G 2203/02; B65G 2203/042
USPC ........ 198/502.1, 502.2, 502.3; 700/217, 218; 356/602, 603
See application file for complete search history.

(56) References Cited

U.S. PATENT DOCUMENTS

| | | | |
|---|---|---|---|
| 5,902,177 A * | 5/1999 | Tessier et al. | 452/156 |
| 6,847,859 B2 * | 1/2005 | Nuebling et al. | 700/217 |
| 7,602,505 B2 * | 10/2009 | Kaltenbach | 356/601 |
| 2002/0067797 A1 * | 6/2002 | Safai et al. | 378/54 |
| 2006/0278708 A1 * | 12/2006 | Olmstead | 235/454 |
| 2007/0165208 A1 * | 7/2007 | Cowburn et al. | 356/71 |
| 2008/0156619 A1 * | 7/2008 | Patel et al. | 198/502.2 |
| 2009/0245616 A1 * | 10/2009 | De La Ballina et al. | 382/141 |
| 2010/0272961 A1 * | 10/2010 | Costin, Jr. | 428/156 |

* cited by examiner

Primary Examiner — James R Bidwell

(57) ABSTRACT

A detection system has a first laser that directs a first laser trace laterally across a surface of a conveyor from an acute angle. A second laser directs a second laser trace laterally across the surface of the conveyor, in spaced apart alignment with the first laser trace, from an acute angle. A camera images from above a field of view that encompasses at least a portion of the first and second laser traces. An image processing system detects a presence or absence of portions of the first and second laser traces, and determines a feature of one of the conveyor and an article inducted onto the conveyor based upon the detecting of the presence or absence.

19 Claims, 7 Drawing Sheets

DUAL LASER ARTICLE DETECTION SYSTEM

PRIORITY

This application claims priority to U.S. Provisional Patent Application Ser. No. 61/832,339, entitled "Loop Sorter Dual Laser Item Detection System," filed on Jun. 7, 2013, the entire contents of which are incorporated by reference herein.

BACKGROUND

The present disclosure generally relates to machine vision detection in a conveyor system, and more particularly to low profile article detection on a conveyor surface. Tilt tray or cross belt carriers of a loop sortation system are specifically disclosed.

Tilt-tray and crossbelt loop sorters are components of high volume distribution and fulfillment operations. To divert an article with the tilt-tray, the sorter senses that the article is present on the tray and is ready to be diverted to a chute. For years, the method of article detection included reflective tape placed centrally along the trays and photo eyes. If an article was present, the photo eyes would detect a "break" in the reflection from the tape, thus indicating an article was present and ready to be sorted. This method can require costly and labor intensive upkeep of the reflective tape. Further, articles not placed directly on the center of the trays, small products, or articles packaged in clear plastic could go undetected, causing double inducts, recirculations, exceptions, and decreased throughput. Thus, there is a need for improved devices and methods for article detection on tilt trays or cross belt carriers of a loop sortation system.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the subject innovation, a method is provided of detecting a flat article on a conveyor. The method includes directing a first laser trace laterally across a top surface of a loop sorter from an acute angle to horizontal above and to a first lateral side; directing a second laser trace laterally across the top surface of the loop sorter, in spaced apart alignment with the first laser trace, from an acute angle to the horizontal above and to a second lateral side; imaging from above a field of view that encompasses at least a portion of the first and second laser traces; detecting a presence or absence of portions of the first and second laser traces; and determining a feature of one of a carrier of the loop sorter and an article inducted onto the carrier based upon the detecting of the presence or absence.

In another aspect of the subject innovation, a detection system includes a first laser to direct a first laser trace laterally across a top surface of a loop sorter from an acute angle to horizontal above and to a first lateral side. A second laser directs a second laser trace laterally across the top surface of the loop sorter, in spaced apart alignment with the first laser trace, from an acute angle to the horizontal above and to a second lateral side. A camera images from above a field of view that encompasses at least a portion of the first and second laser traces. An image processing system detects a presence or absence of portions of the first and second laser traces, and to determine a feature of one of a carrier of the loop sorter and an article inducted onto the carrier based upon the detecting of the presence or absence.

In an additional aspect of the subject innovation, a loop sortation system includes a conveyor system having at least one carrier. A detection system includes a first laser to direct a first laser trace laterally across a top surface of a loop sorter from an acute angle to horizontal above and to a first lateral side. The detection system includes a second laser to direct a second laser trace laterally across the top surface of the loop sorter, in spaced apart alignment with the first laser trace, from an acute angle to the horizontal above and to a second lateral side. The detection system includes a camera to image from above a field of view that encompasses at least a portion of the first and second laser traces. An image processing system of the detection system detects a presence or absence of portions of the first and second laser traces, and to determine a feature of one of a carrier of the loop sorter and an article inducted onto the carrier based upon the detecting of the presence or absence. The detection system includes a network interface to report the feature. A sortation controller is in communication with the network interface to discharge the carrier based at least in part upon the feature.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the present invention.

DETAILED DESCRIPTION

Figure 1:
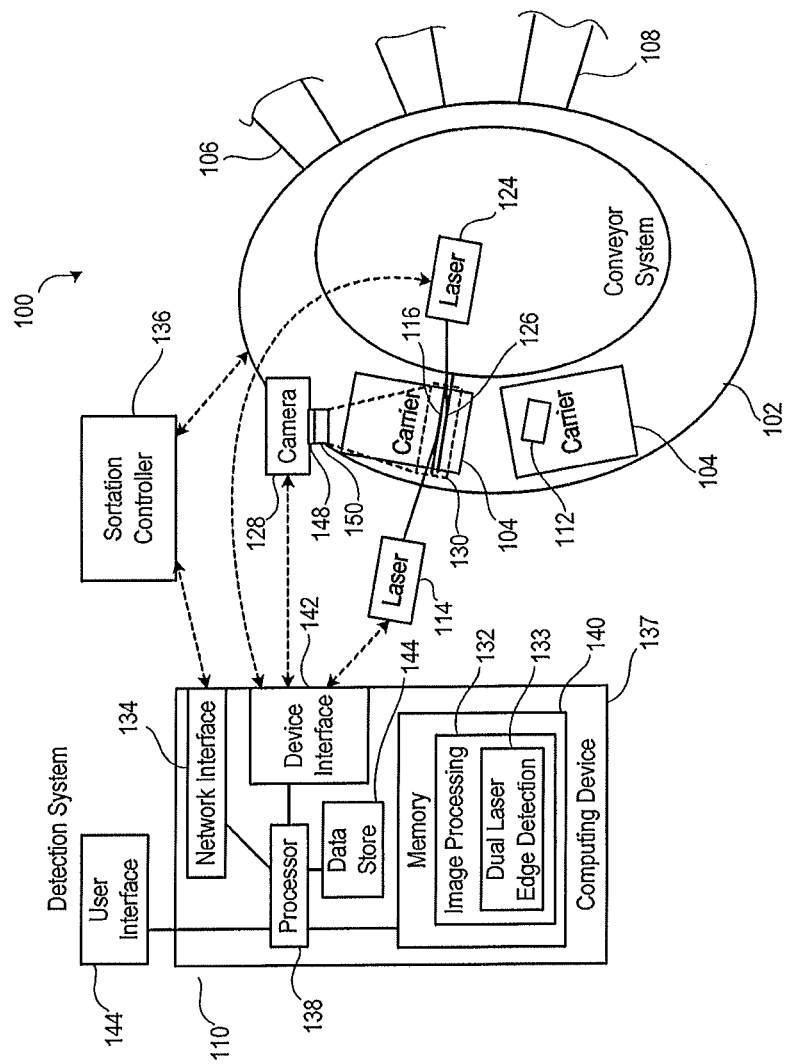
FIG. 1 illustrates a block diagram of an article detection system of a loop sortation system.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
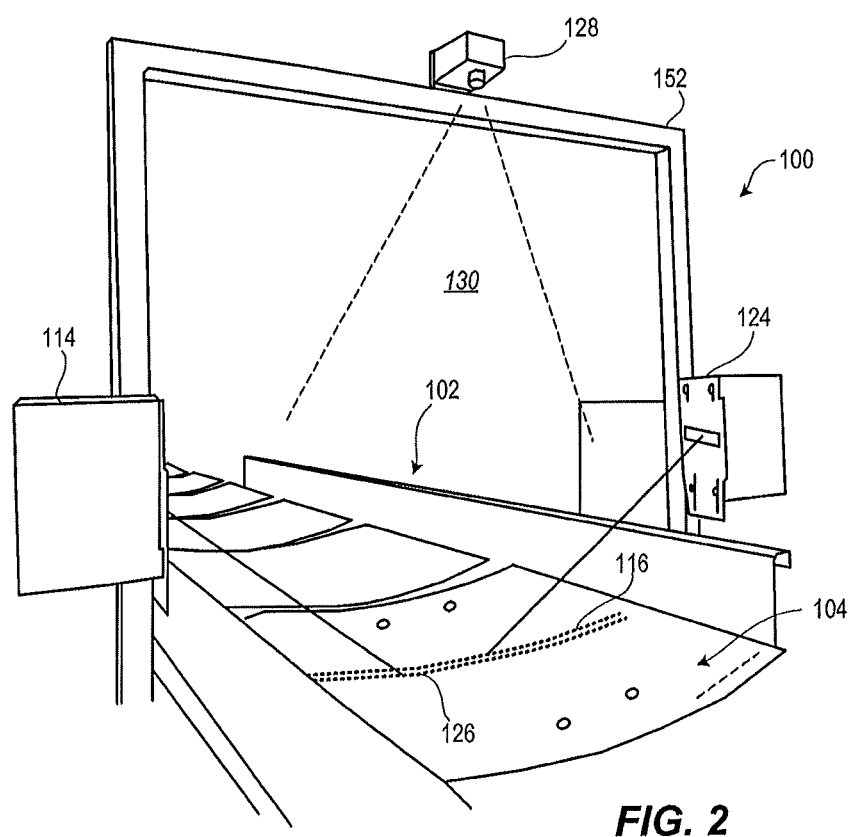
FIG. 2 illustrates a front isometric view of the article detection system of FIG. 1.
Figure 3:
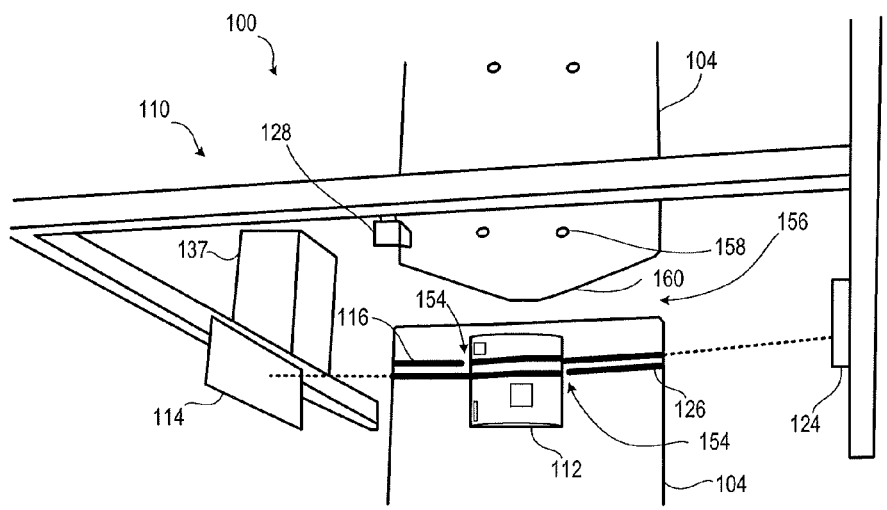
FIG. 3 illustrates a top perspective view of the article detection system of FIG. 1.

Referring to the drawings, FIGS. 1-3 illustrate loop sortation system 100 that includes a conveyor system, depicted as loop sorter 102, having at least one carrier 104. In one aspect, the at least one carrier 104 is a cross belt carrier. In another aspect, the at least one carrier 104 is a tilt tray carrier. With particular reference to FIG. 1, one or more induct lanes or chutes 106 and one or more discharge lanes or chutes 108 can bring and take away from carrier 104 respectively. Article detection system 110 for sortation of articles 112 is configured to detect low profile or flat articles 112, as well as articles 112 offset on the at least one carrier 104. As will be apparent to one with ordinary skill in the art in view of the teachings herein, article detection system 110 may be used with other suitable conveyor systems, such as belt conveyors, shuttles, etc.

According to at least one version, detection system 110 comprises first laser 114 configured to direct first laser trace 116 laterally across surface 118 of loop sorter 102. As shown in FIG. 2, first laser 114 is positioned adjacent loop sorter 102 to direct first laser trace 116 laterally across loop sorter 102 at an acute angle relative to horizontal. While FIG. 2 shows first laser trace 116 directed fully across surface 118 of loop sorter 102, first laser trace 116 can be directed across a portion of surface 118. Detection system 110 further comprises second laser 124 configured to direct second laser trace 126 laterally across surface 118 of loop sorter 102. Second laser 124 is positioned adjacent to loop sorter 102 opposed from first laser 114 to direct second laser trace 126 laterally across loop sorter 102 at an acute angle relative to horizontal. While FIG. 2 shows second laser trace 126 directed fully across surface 118 of loop sorter 102, second laser trace 126 can be directed across a portion of surface 118. FIG. 2 further shows second laser trace 126 is in a spaced apart parallel alignment with first laser trace 116. Other suitable positions for first laser 114 and second laser 124 will be apparent to one with ordinary skill in the art in view of the teachings herein. Other suitable configurations for laser traces 116, 126 will be apparent to one with ordinary skill in the art in view of the teachings herein. For example, detection system 110 can incorporate any suitable number of lasers 114, 124 that project any suitable number of laser traces 116, 126 having any suitable shape to detect article 112 and/or carrier 104.

Detection system 110 includes camera 128 disposed to image from above a field of view (FOV) 130 that encompasses at least a portion of first and second laser traces 116, 126. With reference to FIGS. 2-3, camera 128, first laser 114 and second laser 124 are mounted to an overarching rectangular frame 152. The longitudinal space along loop sorter 102 occupied by detection system 110 is small. As used herein, longitudinal is the direction of travel of carrier 104, and lateral refers to a direction which is across the longitudinal direction which is not limited to perpendicular to the longitudinal direction.

Referring back to FIG. 1, detection system 110 has image processing system 132 to obtain an image within FOV 130. Dual laser edge detection component 133 of image processing system 132 detects a presence or absence of portions of first and second laser traces 116, 126. Based on this presence or absence, dual laser edge detection component 133 determines a feature of one of a carrier 104 of loop sorter 102 and an article 112 on carrier 104. Detection system 110 has network interface 134 to report the feature to sortation controller 136. Sortation controller 136 of loop sortation system 100 is in communication with network interface 134 to discharge carrier 104 in response, at least in part, to the reported feature.

In one aspect, detection system 110 can be implemented as part of computer device 137 that includes at least one processor 138 for carrying out processing functions associated with one or more of components and functions described herein. Processor 138 can include a single or multiple set of processors or multi-core processors. Moreover, processor 138 can be implemented as an integrated processing system or a distributed processing system. Detection system 110 further includes memory 140, such as for storing local versions of applications being executed by processor 138. Memory 140 can include any type of memory usable by a computer, such as random access memory (RAM), read only memory (ROM), tapes, magnetic discs, optical discs, volatile memory, non-volatile memory, and any combination thereof.

Further, detection system 110 includes network interface 134 that provides for establishing and maintaining communications with one or more parties utilizing hardware, software, and services as described herein. Detection system 110 may carry communications between components on detection system 110, as well as between detection system 110 and external devices, such as devices located across a communications network and/or devices serially or locally connected to detection system 110. Processor 138 can communicate with certain components, such as first and second lasers 114, 124, through one or more device interfaces 142.

Additionally, detection system 110 may include data store device 144, which can be any suitable combination of hardware and/or software that provides for mass storage of information, databases, and programs employed in connection with aspects described herein. For example, data store device 144 may be a data repository for applications not currently being executed by processor 138.

Detection system 110 may additionally include user interface component 146 operable to receive inputs from a user of detection system 110 and further operable to generate outputs for presentation to the user. User interface component 146 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 146 may include one or more output devices, including but not limited to a display, a speaker, a haptic feedback mechanism, a printer, any other mechanism capable of presenting an output to a user, or any combination thereof.

In one aspect, the detection system 110 can include optical filter 148, such as behind lens 150 of camera 128, to filter the imaging for a frequency band of first and second laser traces 116, 126.

Figure 4:
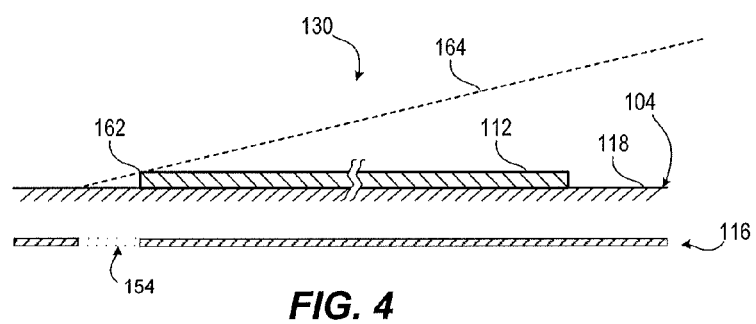
FIG. 4 illustrates a side detail view in vertical cross section and a top detail view of a portion of a laser trace of FIG. 3.

FIGS. 3-4 show article 112 within FOV 130 of camera 128. Although article 112 has a flat or low profile, each laser trace 116, 126 creates respective gaps 154 on opposite sides of article 112 relative to the corresponding laser 114, 124 as a result of laser traces 116, 126 impinging article 112. With particular reference to FIG. 4, the acute angles of respective lasers 114, 124 create gaps 154 in laser traces 116, 126 due to the shadowing effect of edge 162 of article 112. As will be discussed further below, detection system 110 can further detect features of carriers 104, such as longitudinal space 156 between leading and trailing carriers 104, fastener features 158, and tapered leading edge 160 of a carrier 104.

Figure 5:
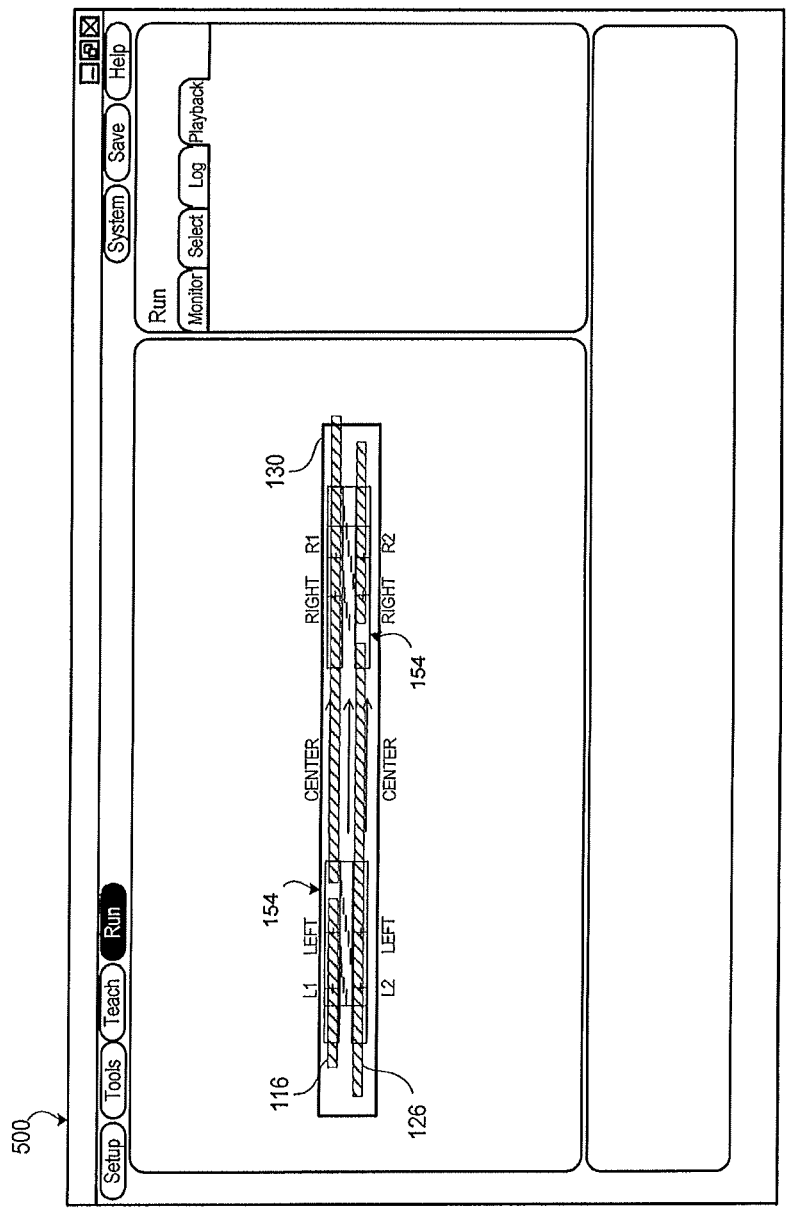
FIG. 5 illustrates a graphical depiction of a user interface of an image processing system of the article detection system of FIG. 1.

FIG. 5 shows graphical depiction 500 from image processing system 132 (FIG. 1) that includes FOV 130, with first and second laser traces 116, 126 and gaps 154. Graphical depiction 500 shows the presence of article 112 by depicting gaps 154 in first and second laser traces 116, 126. Of course other suitable methods for providing feedback to a user will be apparent to one with ordinary skill in the art in view of the teachings herein.

Figure 6:
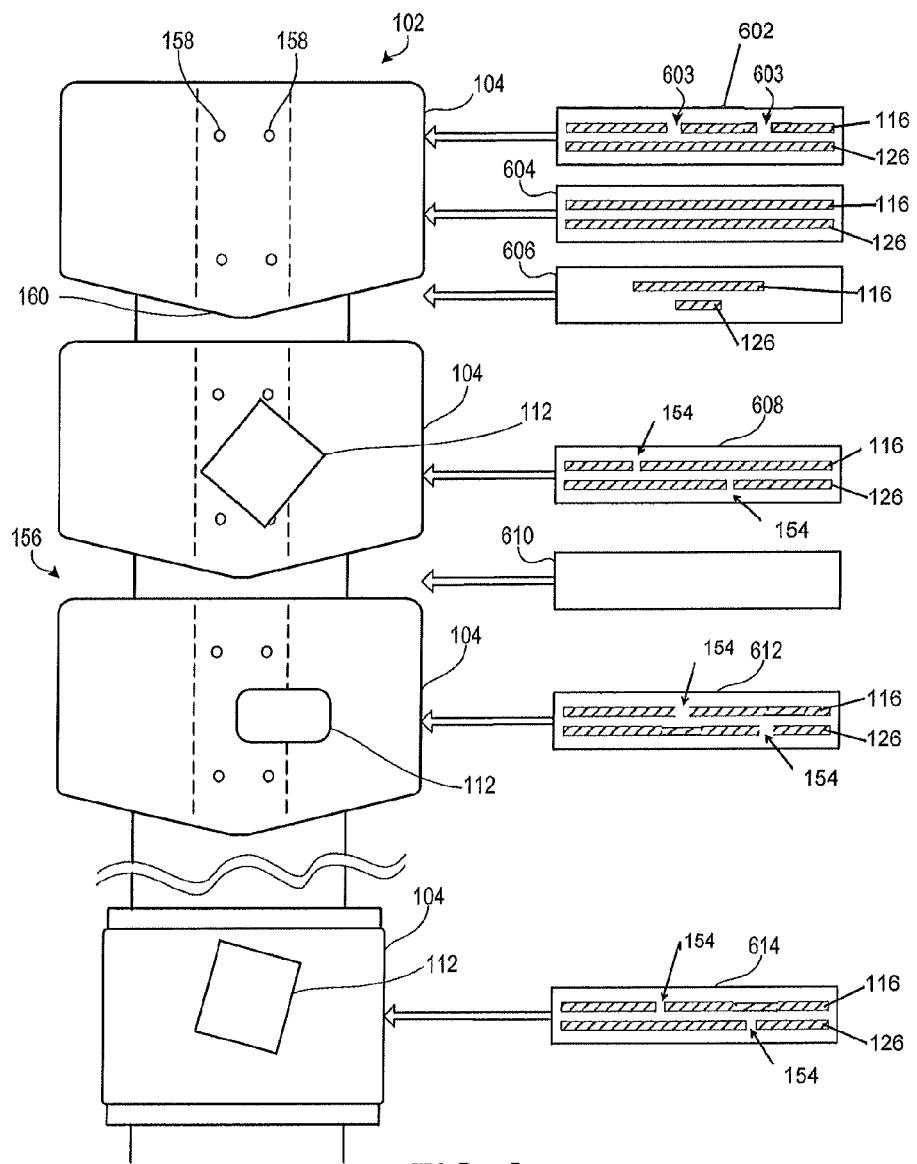
FIG. 6 illustrates a top view of a loop sortation system of FIG. 1 with a tilt tray and cross belt carriers with corresponding field of views.

Referring to FIG. 6, loop sorter 102 can include features that are detected by detection system 110 (FIG. 1). For example as depicted at 602, image processing system 132 is operable to detect fastener features 158, such as a head of a fastener, or other attachment detail by detecting gaps 603 in at least one of first and second laser traces 116, 126 in response to the presence of fastener features 158. Fastener features 158 can be differentiated from gaps 154 caused by article 112 by detecting fastener features 158 in a single laser trace 116, 126 at a pre-set lateral position. Other suitable methods for detecting fastener features 158 will be apparent to one with ordinary skill in the art in view of the teachings herein. As depicted at 604, first and second laser traces 116, 126 are unbroken, indicating an empty portion of surface 118 of carrier 104. As depicted at 606, first and second laser traces 116, 126 are truncated, indicating tapered leading edge 160 of carrier 104.

As depicted at 608, article 112 is positioned on carrier 104, thereby creating gaps 154 in each one of first and second laser traces 116, 126. This allows the lateral edges of article 112 to be determined. As depicted at 610, image processing system 132 determines a feature based at least in part upon a longitudinal space 156 between carriers 104 based upon detecting an absence of at least one of first and second laser traces 116, 126. As depicted at 612, gaps 154 are detected in each one of first and second laser traces 116, 126, allowing the determination of lateral edges of another article 112 placed off-center on surface 118. As depicted at 614, gaps 154 are detected in each one of first and second laser traces 116, 126 to detect article 112 on carrier 104, which is depicted as a crossbelt rather than a tilt tray. It should be appreciated that the angle of the lasers and the fan width of its tracing can be selected to look over an upwardly angled edge of a tilt tray and to be low enough to cast a discernible gap for very flat articles. Thereby, image processing system 132 determines the feature by determining lateral edges of article 112 on carrier 104 based upon detecting a first gap 154 in first laser trace 116 and second gap 154 in second laser trace 126. As shown in FIG. 6, first gap 154 is positioned closer to a second lateral side of article 112, while second gap 154 is positioned closer to a first lateral side of article 112 (i.e., on the opposite side of article 112 with regard to the respective laser 114, 124). Although FIG. 6 shows gaps 154 formed within two laser traces 116, 126 to detect the presence of article 112, detection system 110 can include any suitable number of laser traces 116, 126 of varying widths and lengths to detect articles 112.

In an exemplary aspect, camera 128 is a miniProII with a red bandpass filter placed behind the lens, which is a 6 mm with focus and F-stop adjustment. First and second lasers 114, 124 are 50 mW, 60 degree fan angle, 660 nm wavelength, class 3a. The position of first and second lasers 114, 124 are approximately 45 degrees pointing downward at 24" from center of the tray (carrier 104), and 12" above the tray surface. Image processing system 132 can be PresencePLUS software available from Banner Engineering Corp., Minnesota, Minn. Parameters can be as follows: set lens aperture to an almost open position with the image being in focus on a carrier surface, exposure time can be approximately 1.50 ms, gain can be set to 50, and FOV can be resized to fit the first and second laser lines or traces.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 7:
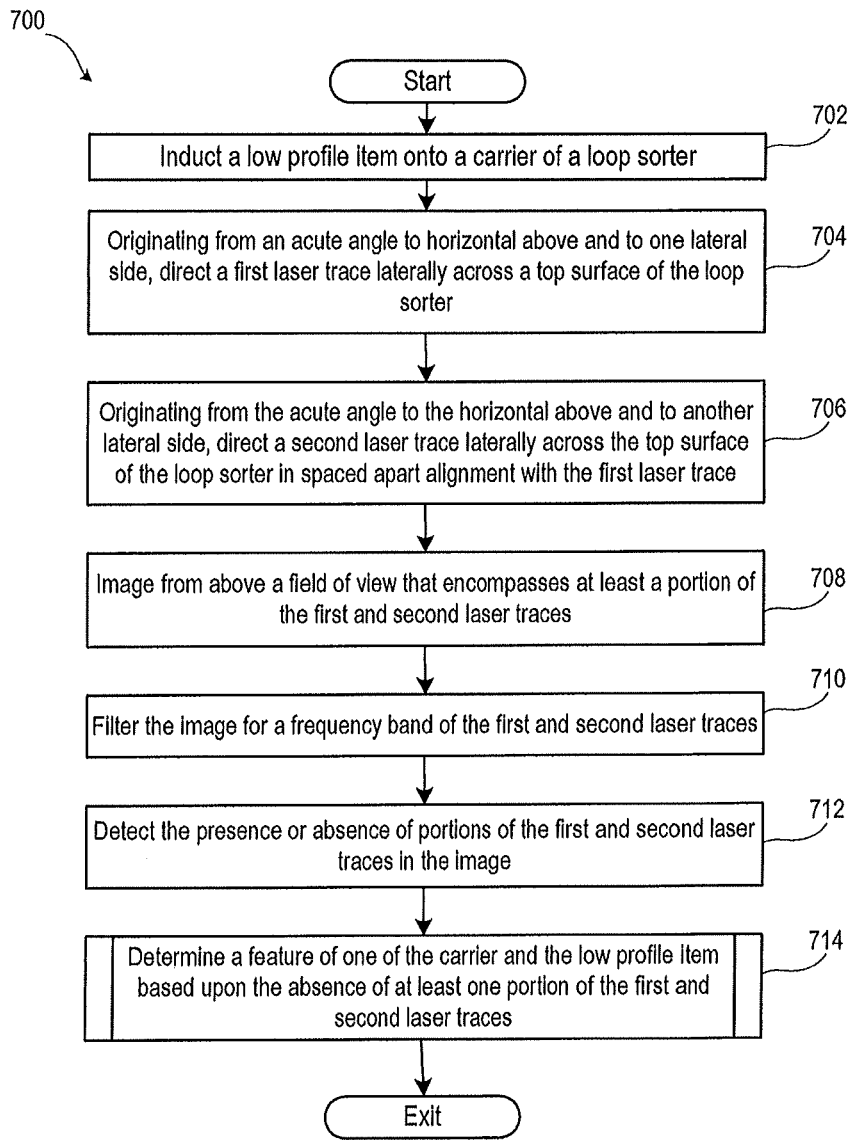
FIG. 7 illustrates a flow diagram of a method for detecting articles inducted onto the loop sortation system of FIG. 1.

With reference to FIG. 7, method 700 is provided for detecting an article on a conveyor according to at least one aspect. A loop sorter inducts an article onto a carrier of a loop sorter (block 702). The article can have any type of profile, including a low profile such as that of a very flat article. A first laser under control of detection system directs a first laser trace laterally across a top surface of the loop sorter from an acute angle relative to horizontal (block 704). The first laser trace can be projected fully across the surface of the loop sorter or across a portion of the surface. A second laser under control of the detection system directs a second laser trace laterally across the top surface of the loop sorter, in spaced apart alignment with the first laser trace, from an acute angle relative to horizontal (block 706). The second laser 124 can be positioned on an opposite side of the loop sorter from the first laser. The second laser trace can be projected fully across the top surface of the loop sorter or across a portion of the surface.

An image processing system of the detection system images from above a field of view that encompasses at least a portion of the first and second laser traces (block 708). An optical filter filters the image for a frequency band of the first and second laser traces (block 710). The detection system detects a presence or absence of portions of the first and second laser traces (block 712). The detection system determines a feature of one of a carrier of the loop sorter and an article on the carrier based upon the detection of the presence or absence (block 714).

Figure 8:
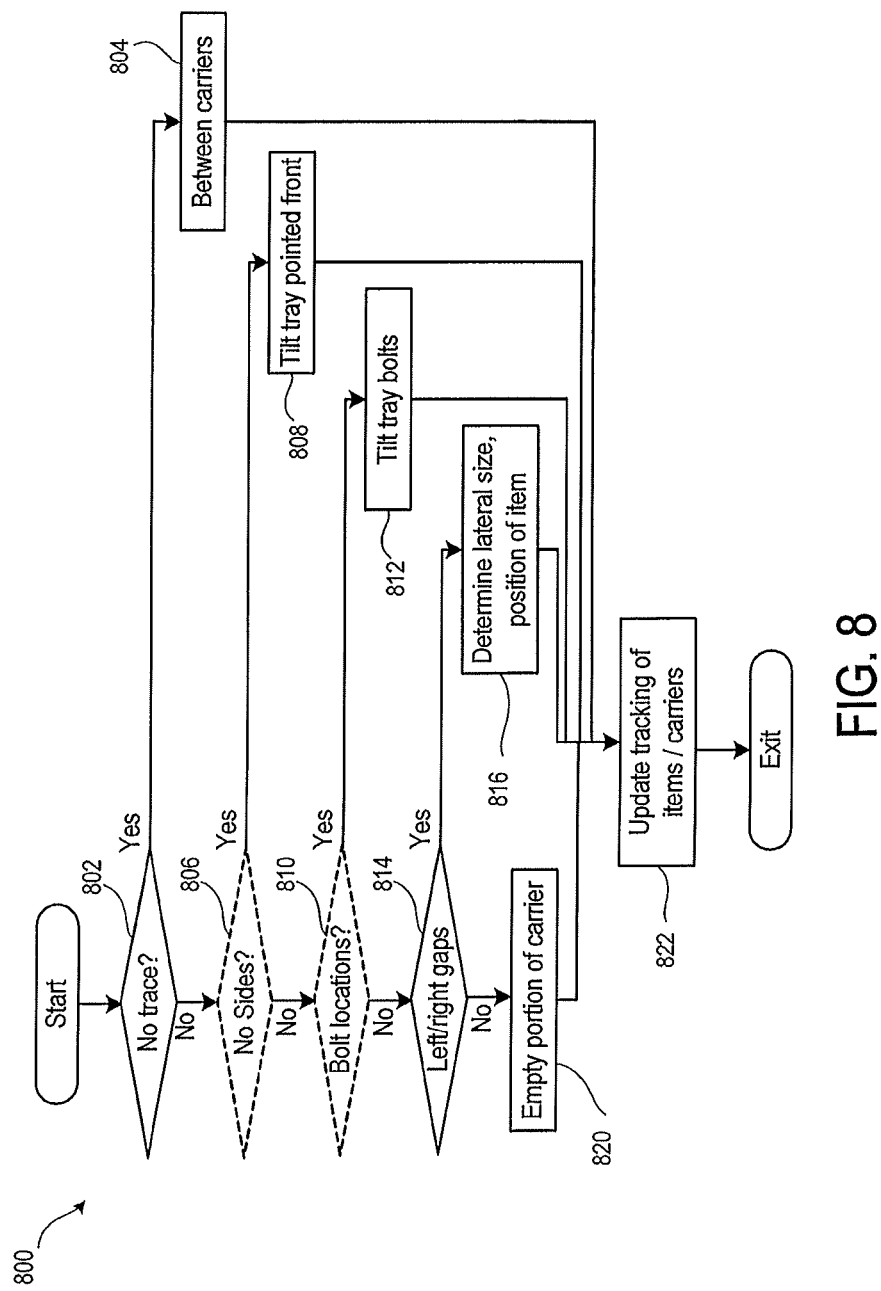
FIG. 8 illustrates a flow diagram of a method for determining features of the carrier and articles inducted for the method of FIG. 7.

In FIG. 8, a method 800 provides illustrative examples of the feature determination of block 714 (FIG. 7). For example, the method 800 can determine the feature by determining a space between carriers based upon detecting an absence of at least one of the first and second laser traces (block 802). If so, a gap between carriers as been detected (block 804).

Alternatively or in addition, the method 800 can determine the feature by determining an attachment detail of the carrier based upon detecting a gap in at least one of the first and second laser traces at a pre-set lateral position (806). In an exemplary aspect for a tilt tray, the method 800 can detect no lateral sides on the laser traces (outside ends of the laser traces truncated) indicative of a taper leading edge of the tilt tray (block 808). If so, a tapered leading edge is detected (block 810).

Alternatively or in addition, the method 800 can determine the feature by determining an attachment detail of the carrier based upon detecting a gap in at least one of the first and second laser traces at a pre-set lateral position (block 812). If so, tilt tray bolts are detected (block 814).

Alternatively or in addition, the method 800 can determine the feature by determining a lateral edges of the article inducted onto the carrier based upon detecting a first gap in the first laser trace and a second gap in the second laser trace, wherein the first gap is closer to the second lateral side than the first lateral side and the second gap is closer to the first lateral side than the second lateral side (block 816). If so, the lateral size and position of article can be determined based upon the first and second gaps (block 818).

If none of the determination identify a feature (i.e., unbroken traces are detected), then a determination is made that an empty portion of the carrier is being detected (block 820). In certain versions consistent with the present disclosure, the features are tracked over time such that a model of the loop sorter and any articles carried thereon are updated and maintained (block 822).

Detection system 110 can eliminate a need for reflective tape and photoeyes to allow for more diverse product sizes and packaging to be conveyed. Detection system 110 can provide features and benefits such as (i) increased monitoring area of detection zone; (ii) user-friendly operating software for camera application; (iii) overhead lighting in building has no impact to camera detection; (iv) costly and maintenance intensive reflective tape not required; (v) compact footprint—space requirement is 4"-5" longitudinally overall; (vi) overall minimum product height reduced from ½" to ⅛"; (vii) eliminates undetected articles that are housed in a clear plastic; (viii) increases tray utilization based on reduction and/or elimination of re-circulations, false reads and exceptions that may have been created by the reflective tape and photo-eye solution; (ix) no article "hang ups" potentially caused by worn and/or damaged tape; and (x) reduced commissioning, installation time, and power consumption as compared to other article detection solutions. Reflective tape currently on the tilt trays does not need to be removed.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology had been used for the sake of clarity. To the extent that the term "includes" is used in either the detailed description or the claims, such term is intended to be inclusive in a manner similar to the term "comprising" as "comprising" is interpreted when employed as a transitional word in a claim. It is to be understood that each specific term includes all technical equivalents which operate in a similar manner to accomplish a similar purpose. It is intended that the scope of the invention be defined by the claims submitted herewith.

What is claimed is:

1. A method of detecting an article on a conveyor, the method comprising:
    directing a first laser trace laterally across a surface of the conveyor from an acute angle;
    directing a second laser trace laterally across the surface of the conveyor, in spaced apart alignment with the first laser trace, from an acute angle;
    imaging from above a field of view that encompasses at least a portion of the first and second laser traces;
    detecting a presence or absence of portions of the first and second laser traces; and
    determining a feature of the article on the conveyor based upon the detecting of the presence or absence.

2. The method of claim 1, further comprising:
    filtering the imaging for a frequency band of the first and second laser traces.

3. The method of claim 1, wherein the conveyor system comprises a loop sorter.

4. The method of claim 3, further comprising a determining feature of a carrier of the loop sorter based upon the detecting of the presence or absence.

5. The method of claim 4, wherein determining the feature of the carrier further comprises:
    determining a space between a first carrier and a second carrier based upon detecting an absence of at least one of the first and second laser traces.

6. The method of claim 4, wherein determining the feature of the carrier further comprises:
    determining an attachment detail of the carrier based upon detecting a gap in at least one of the first and second laser traces at a pre-set lateral position.

7. The method of claim 4, wherein determining the feature of the carrier further comprises:
    determining a leading edge of the carrier based upon detecting a truncation in at least one of the first and second laser traces.

8. The method of claim 1, wherein determining the feature of the article further comprises:

determining lateral edges of the article based upon detecting a first gap in the first laser trace and a second gap in the second laser trace.

9. The method of claim 8, wherein the first gap is closer to a second lateral side than a first lateral side and the second gap is closer to the first lateral side than the second lateral side.

10. The method of claim 1, wherein the first laser trace and the second laser trace are directed in opposite directions across the surface of the conveyor.

11. A detection system, comprising:
a first laser configured to direct a first laser trace laterally across a surface of a conveyor from an acute angle;
a second laser configured to direct a second laser trace laterally across the surface of the conveyor, in spaced apart alignment with the first laser trace, from an acute angle;
a camera configured to image from above a field of view that encompasses at least a portion of the first and second laser traces; and
an image processing system configured to detect a presence or absence of portions of the first and second laser traces and wherein the image processing system is operable to determine a feature of one of the conveyor and an article on the conveyor based upon the detecting of the presence or absence.

12. The detection system of claim 11, further comprising:
an optical filter configured to filter the imaging for a frequency band of the first and second laser traces.

13. The detection system of claim 11, wherein the conveyor comprises a loop sorter, wherein the image processing system is further operable to determine a feature of a carrier of the loop sorter by determining a space between carriers based upon detecting an absence of at least one of the first and second laser traces.

14. The detection system of claim 11, wherein the conveyor comprises a loop sorter, wherein the image processing system is further operable to determine a feature of a carrier of the loop sorter by determining an attachment detail of the carrier based upon detecting a gap in at least one of the first and second laser traces at a pre-set lateral position.

15. The detection system of claim 11, wherein the image processing system is further operable to determine the feature by determining lateral edges of the article based upon detecting a first gap in the first laser trace and a second gap in the second laser trace.

16. The detection system of claim 11, wherein the conveyor comprises a loop sorter, wherein the image processing system is further operable to determine a leading edge of a carrier of the loop sorter based upon detecting a truncation in at least one of the first and second laser traces.

17. A conveyor system, comprising:
a conveyor; and
a detection system, comprising:
a first laser configured to direct a first laser trace laterally across a surface of a conveyor from an acute angle;
a second laser configured to direct a second laser trace laterally across the surface of the conveyor, in spaced apart alignment with the first laser trace, from an acute angle;
a camera configured to image from above a field of view that encompasses at least a portion of the first and second laser traces; and
an image processing system configured to detect a presence or absence of portions of the first and second laser traces and wherein the image processing system is operable to determine a feature of one of the conveyor and an article on the conveyor based upon the detecting of the presence or absence.

18. The conveyor system of claim 17, wherein the detection system comprises a network interface to report the feature.

19. The conveyor system of claim 18 further comprising a sortation controller in communication with the network interface to discharge the conveyor based at least in part upon the feature.

* * * * *